TUNABLE TELEVISION RECEIVER

Filed Aug. 22, 1963 6 Sheets-Sheet 1

INVENTOR.
John F. Bell
BY Francis W. Crotty
Atty.

Jan. 31, 1967 J. F. BELL 3,302,119

TUNABLE TELEVISION RECEIVER

Filed Aug. 22, 1963 6 Sheets-Sheet 2

INVENTOR.
John F. Bell
BY
Francis W. Crotty
Atty.

TUNABLE TELEVISION RECEIVER

Filed Aug. 22, 1963

INVENTOR.
John F. Bell
BY
Francis W. Crotty
Atty.

Jan. 31, 1967 J. F. BELL 3,302,119

TUNABLE TELEVISION RECEIVER

Filed Aug. 22, 1963 6 Sheets-Sheet 4

INVENTOR.
John F. Bell
BY
Francis W. Crotty
Atty

Jan. 31, 1967 J. F. BELL 3,302,119

TUNABLE TELEVISION RECEIVER

Filed Aug. 22, 1963 6 Sheets-Sheet 5

INVENTOR.
John F. Bell
BY Francis W. Crotty
Atty.

TUNABLE TELEVISION RECEIVER

Filed Aug. 22, 1963 6 Sheets-Sheet 6

INVENTOR.
John F. Bell
BY Francis W. Crotty
Atty.

United States Patent Office 3,302,119

Patented Jan. 31, 1967

3,302,119

TUNABLE TELEVISION RECEIVER

John F. Bell, Wilmette, Ill., assignor to Zenith Radio Corporation, Chicago, Ill., a corporation of Delaware Filed Aug. 22, 1963, Ser. No. 303,822
17 Claims. (Cl. 325—471)

The present invention is directed to a tunable television broadcast receiver and concerns, more particularly, the construction and arrangement of a television receiver which may be tuned to select any signal channel in either the very high frequency (VHF) or ultra high frequency (UHF) bands which have been allotted to television broadcast services by the Federal Communications Commission (FCC).

The frequency distribution of television channels within these bands has imposed severe specifications upon any tuning arrangement which might otherwise be proposed to permit continuous tuning over both bands as required for complete flexibility of a television instrument. For instance, the VHF band is itself divided between a lower portion which extends from 54 to 88 megacycles accommodating channels 2–6, and an upper portion between 174 and 216 megacycles in which are assigned channels 7–13. The UHF band has a lower limit of 470 and an upper limit of 890 megacycles within which are assigned 70 additional television channels. Since each channel in either band has a 6 megacycle width, and since the bands are discontinuous or separated in the frequency spectrum, the difficulties of a tuning arrangement for all channel reception are self evident. In fact, it has been the practice heretofore to construct television receivers with provisions for selection of any channel in the VHF band only but arranged to the end that an auxiliary tuner with continuous tuning throughout the UHF band may be added to the instrument if desired. Obviously, this is a costly approach and frequently adds undesirably to the space requirements of the instrument which have become of more particular concern in recent years with the advent of slim portable instruments.

The problem of all channel tuning for television receivers has become acute with the recent requirement of the FCC that instruments shall have the capability of all channel selection in both the VHF and UHF bands. In seeking a solution to this problem, it is highly desirable to retain the customer conveniences that have already been introduced, such as remote control tuning which has met with enthusiastic acceptance. One proposal contemplates the use of preset tuning techniques, similar to those that were popular in push-button tuning of radio receivers, to tune the receiver to a desired channel. It has further been suggested that the receiver be equipped with automatic frequency control which becomes effective after the preset tuning operation has been completed to, in effect, accomplish vernier tuning by reactance tube control of the local oscillator. This proposal, however, is not acceptable in the special environment of an all channel television receiver for a number of reasons. Importantly, the stability point of this type of AFC system varies with the initial deviation in tuning. That is to say, the original deviation divided by the gain of the system determines the stability point which is an unattractive characteristic of prior arrangements for the tuning problem presented by an all channel television receiver.

Accordingly, it is a principal object of the invention to provide a novel tuning arrangement for a television broadcast receiver.

A more particular object of the invention is to provide a new and improved tuning system for an all channel television receiver.

Another particular object of the invention is to provide a tuning arrangement for a television receiver which may be employed to accomplish all channel tuning and yet permit remote control of the receiver.

A more specific object of the invention is the provision of a tuning arrangement for an all channel television receiver which lends itself to preset tuning, to continuous manual tuning and also to remote control of either preset or continuous tuning.

A tunable television broadcast receiver, in accordance with one aspect of the invention, comprises signal-translating means including at least one mechanically adjustable tuning element for tuning the receiver to any selected one of a plurality of television signal channels. There is a physically displaceable member, mechanically coupled to the tuning element to effect adjustment thereof, and a bi-directional driving system is provided for displacing that member. There is a selectively operable preset tuning device for energizing the driving system to displace such member to a predetermined position corresponding to the tuning of the receiver to a selected one of the television channels. A frequency control system is coupled to the signal-translating means for deriving a control signal having a polarity and amplitude representing the sense and magnitude of the deviation, if any, in the tuning condition of the receiver from that required to tune accurately to the selected signal channel. Finally, there are means for utilizing the control signal to energize the driving system in order to establish and maintain the receiver tuned to the selected signal.

One feature of the preset tuning device is that its control of the driving system causes the displaceable member and the tuning element to be driven in the direction which represents the shortest travel to the home position. As used here, "home position," means the position of the displaceable member and the adjustment of the tuning element required to achieve selection of a particular signal channel.

The preset tuning device contributes still another attractive feature in that it imposes a restriction or limitation in the tuning deviation that the receiver may experience. More specifically, when preset tuning has been achieved, the adverse effect of interference, for example, in detuning the receiver by influencing the automatic frequency control system is restricted to a small frequency range. In particular, the deviation is limited to avoid the possibility of adjacent channel signals affecting the control, or permanent loss of desired signal from transient interference or as transient loss of signal.

The circuitry of the automatic frequency control system is unique and is especially useful in that it takes advantage of transistor circuitry. Limiting devices protect the transistors from burn out by confining to a selected maximum value, the excitation of the transistors from a frequency discriminator-detector. This is accomplished by taking advantage of the forward characteristic of silicon diodes. The system further includes an override feature which permits the preset arrangement to accomplish its restriction on deviation in tuning by overriding the automatic frequency control system and avoiding the necessity for disabling that system in order to confine tuning deviations.

Another feature of the arrangement affords further protection, especially against adjacent channel interference, by enabling the AFC system only during operating intervals in which the tuning condition is at least approximately that required for the selection of a particular channel. For the case of an intercarrier receiver this is achieved by deriving a signal from the sound channel in response to the intercarrier component and utilizing that signal to enable the AFC system.

Other features of this invention include the structure of a continuously tunable VHF tuner and a UHF tuner that is continuously tunable and exhibits a substantially constant bandwidth over its tuning range.

The various features of the invention which are believed to be novel are set forth with particularity in the appended claims. The invention, together with further objects and advantages thereof, may best be understood by reference to the following description taken in conjunction with the accompanying drawings, in the various figures of which like parts are identified by similar reference characters and in which:

Figure 1:
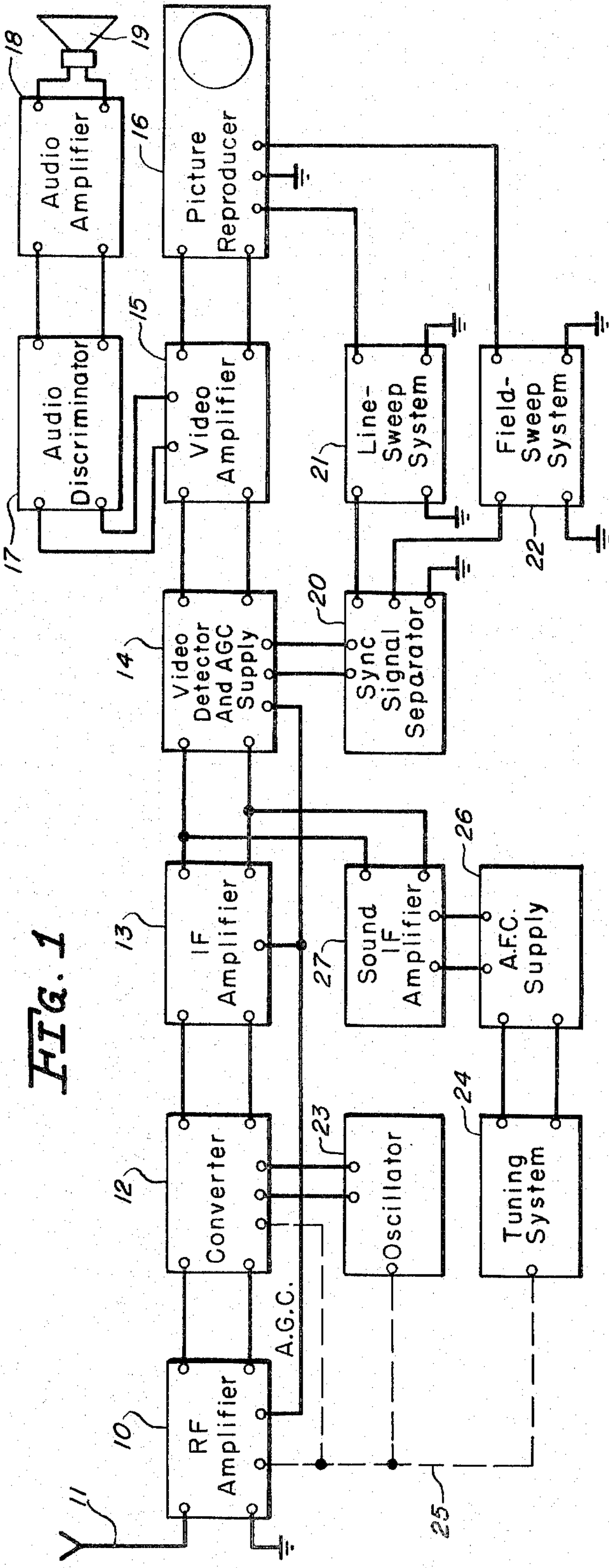
FIGURE 1 is a schematic representation of a television receiver embodying the invention.
Figure 13C:
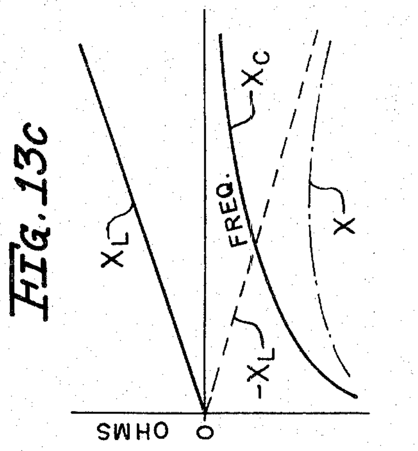
Figure 13B:
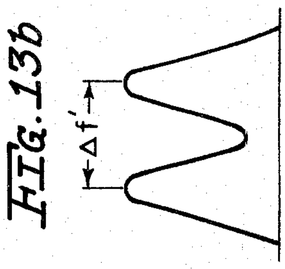
Figure 13A:
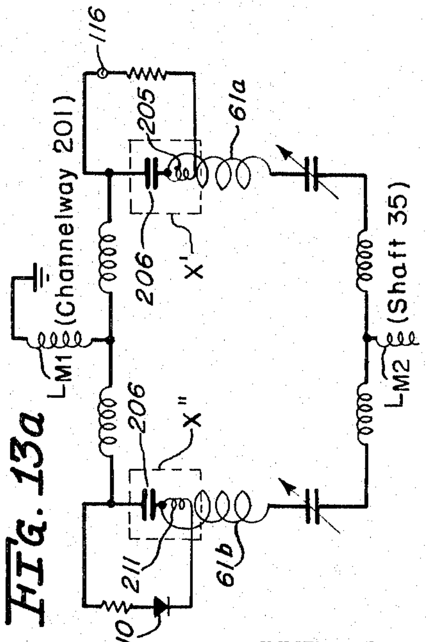
Figures 2, 4, 6:
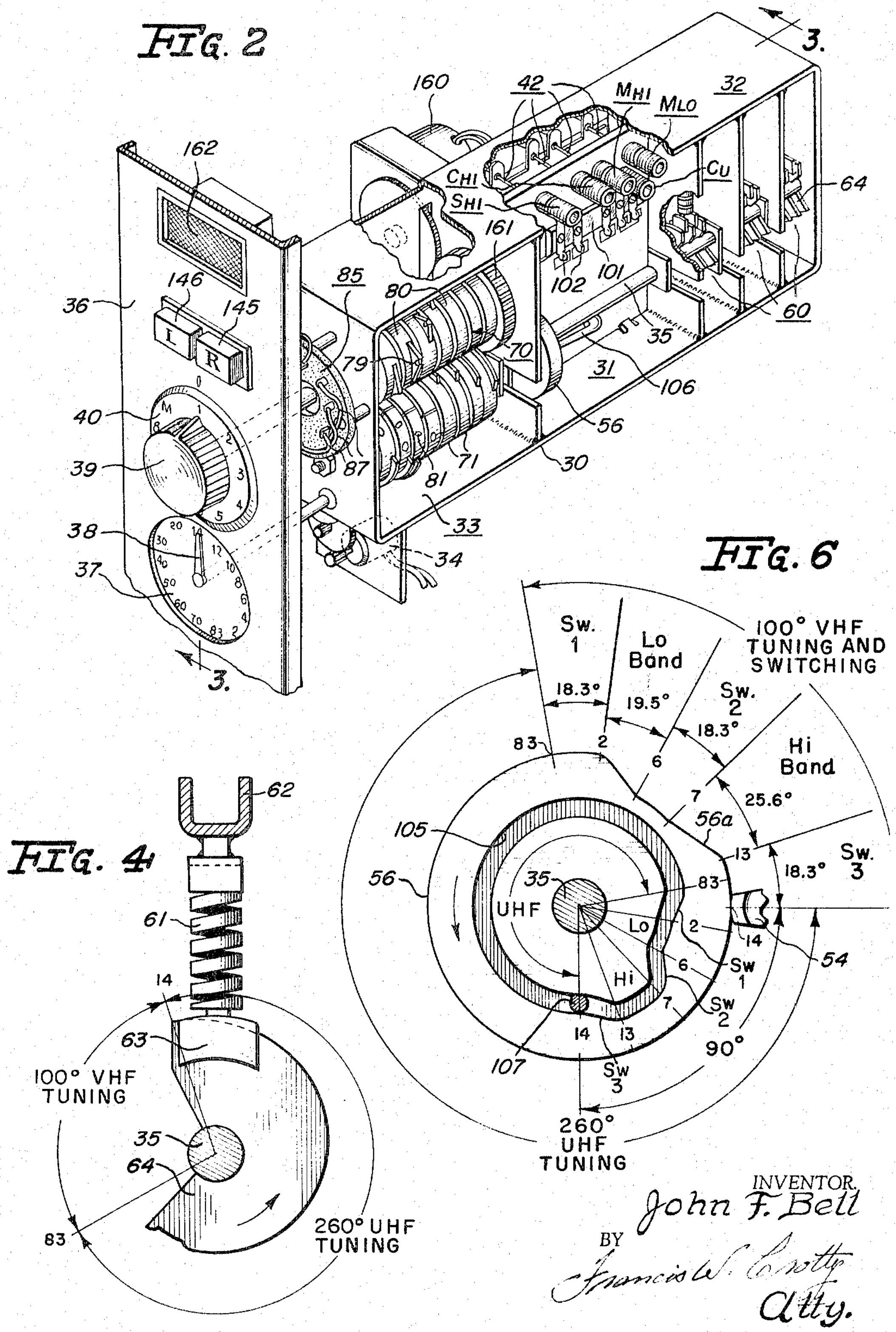
FIGURE 2 is a perspective view of a VHF and UHF tuner embodying the invention.
Figures 3, 5A:
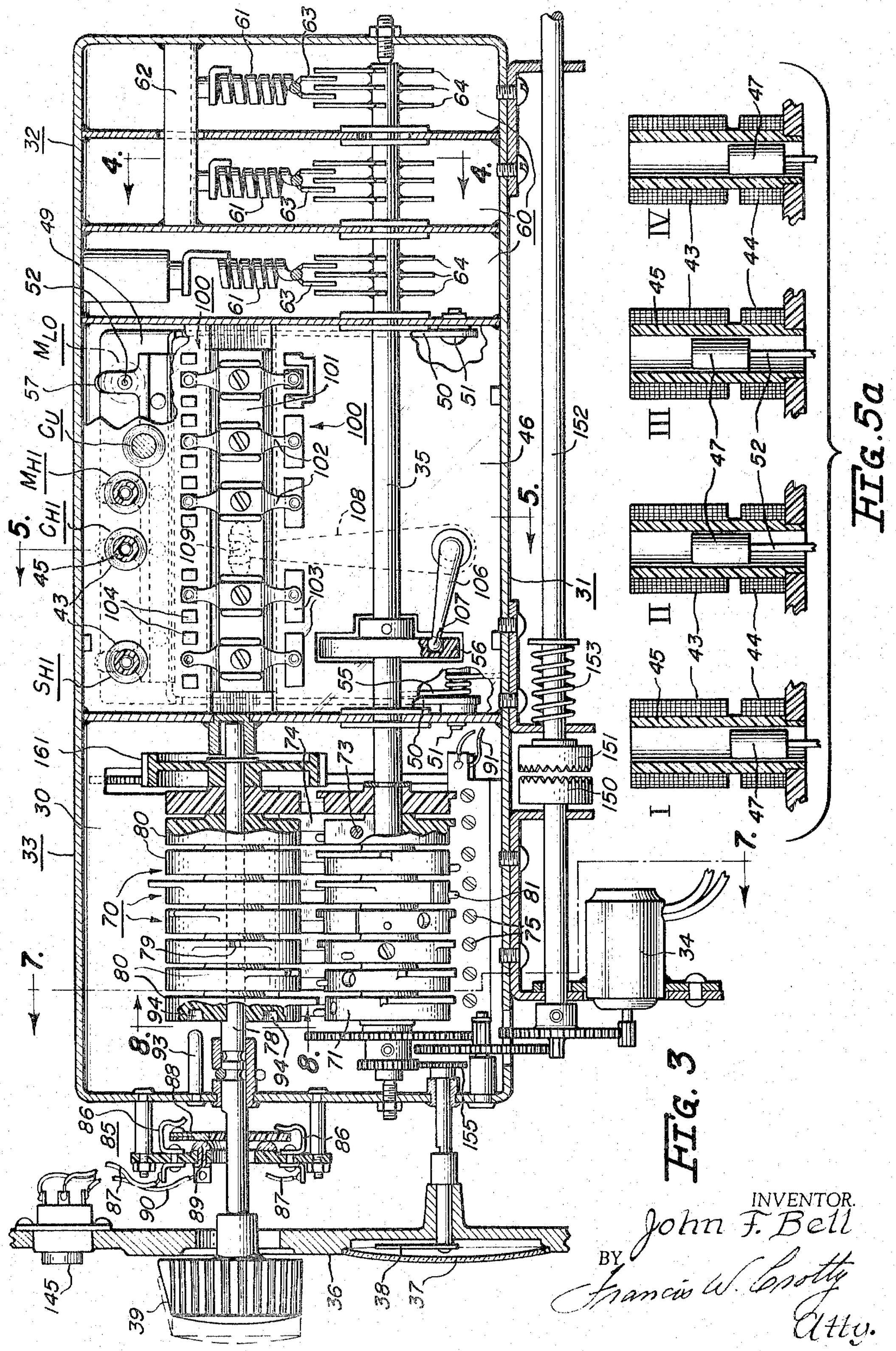
FIGURE 3 is a view taken along section line 3—3 of FIGURE 2.
Figure 7:
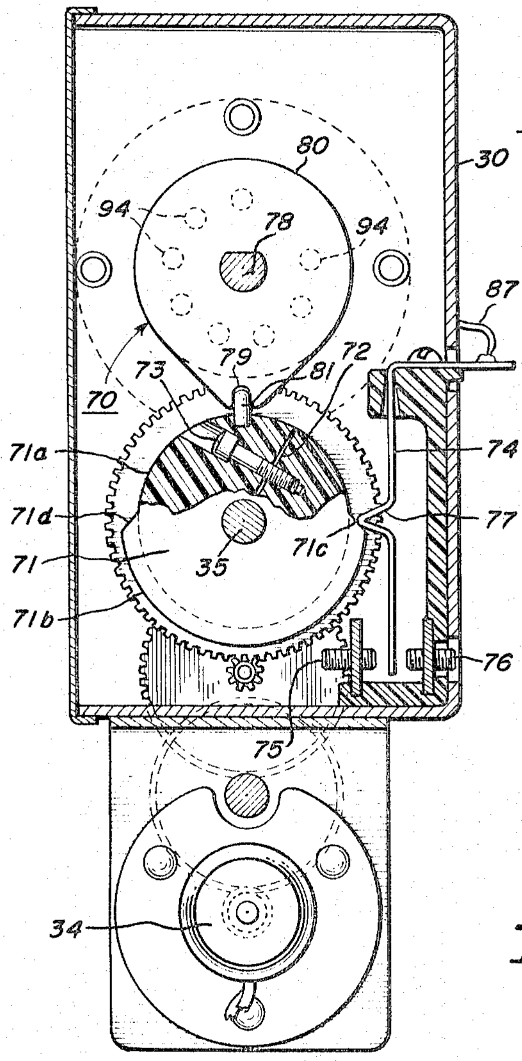
Figure 5:
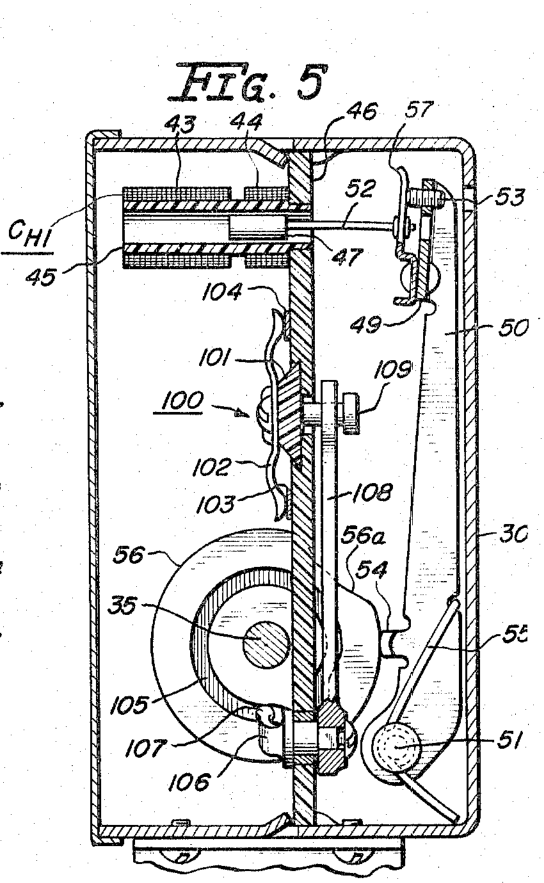
Figure 8:
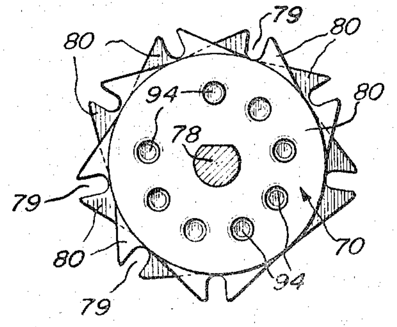
Figure 9:
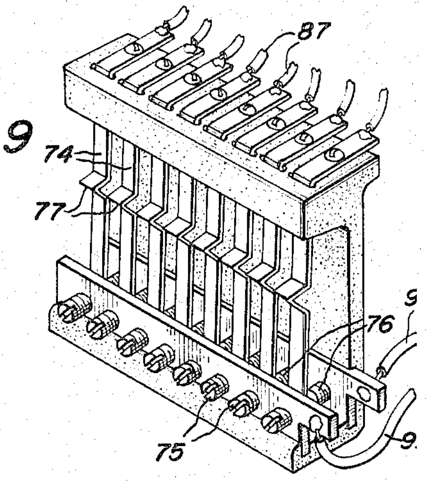
Figures 10, 11, 12, 14:
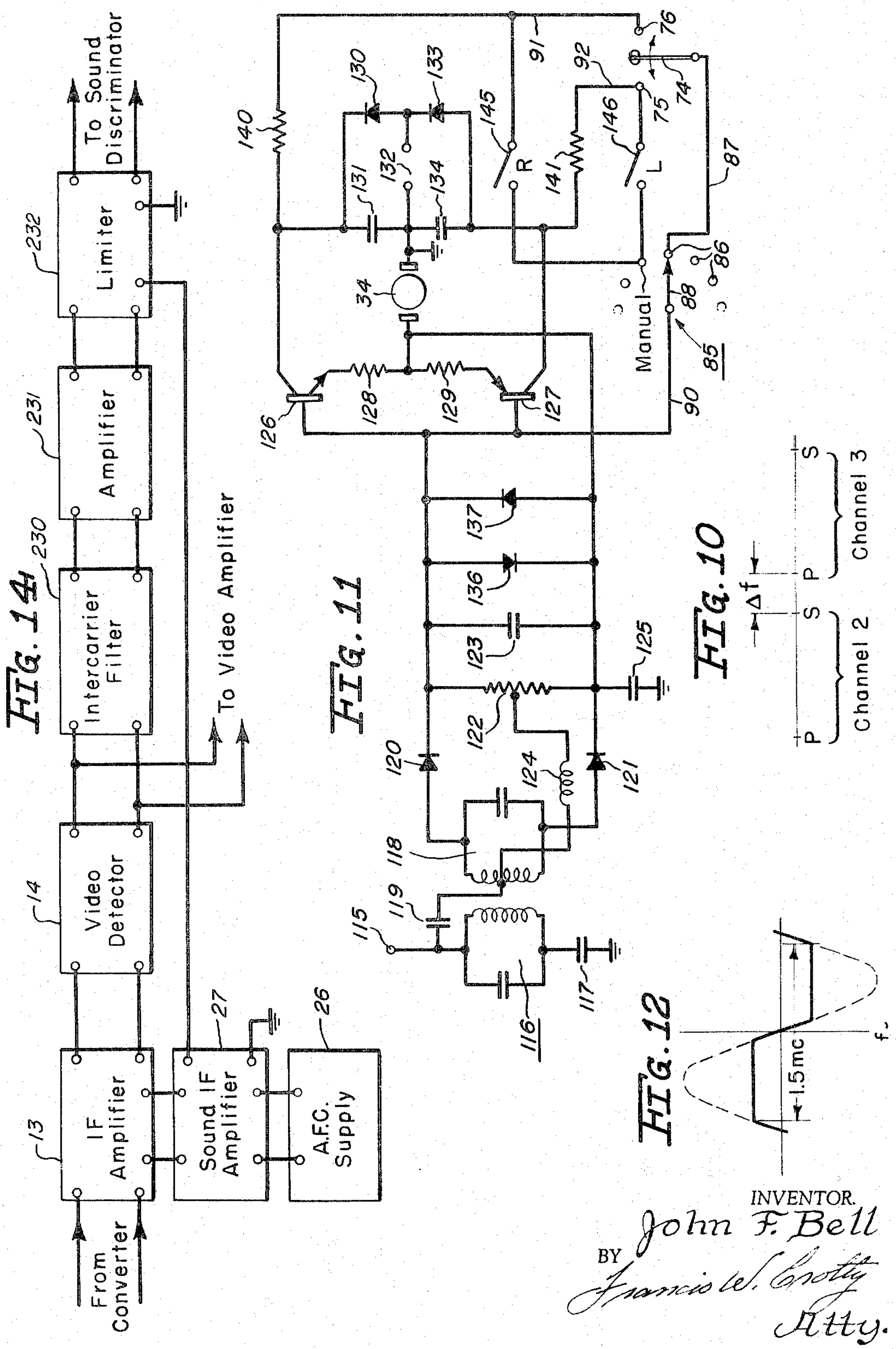
Figure 13:
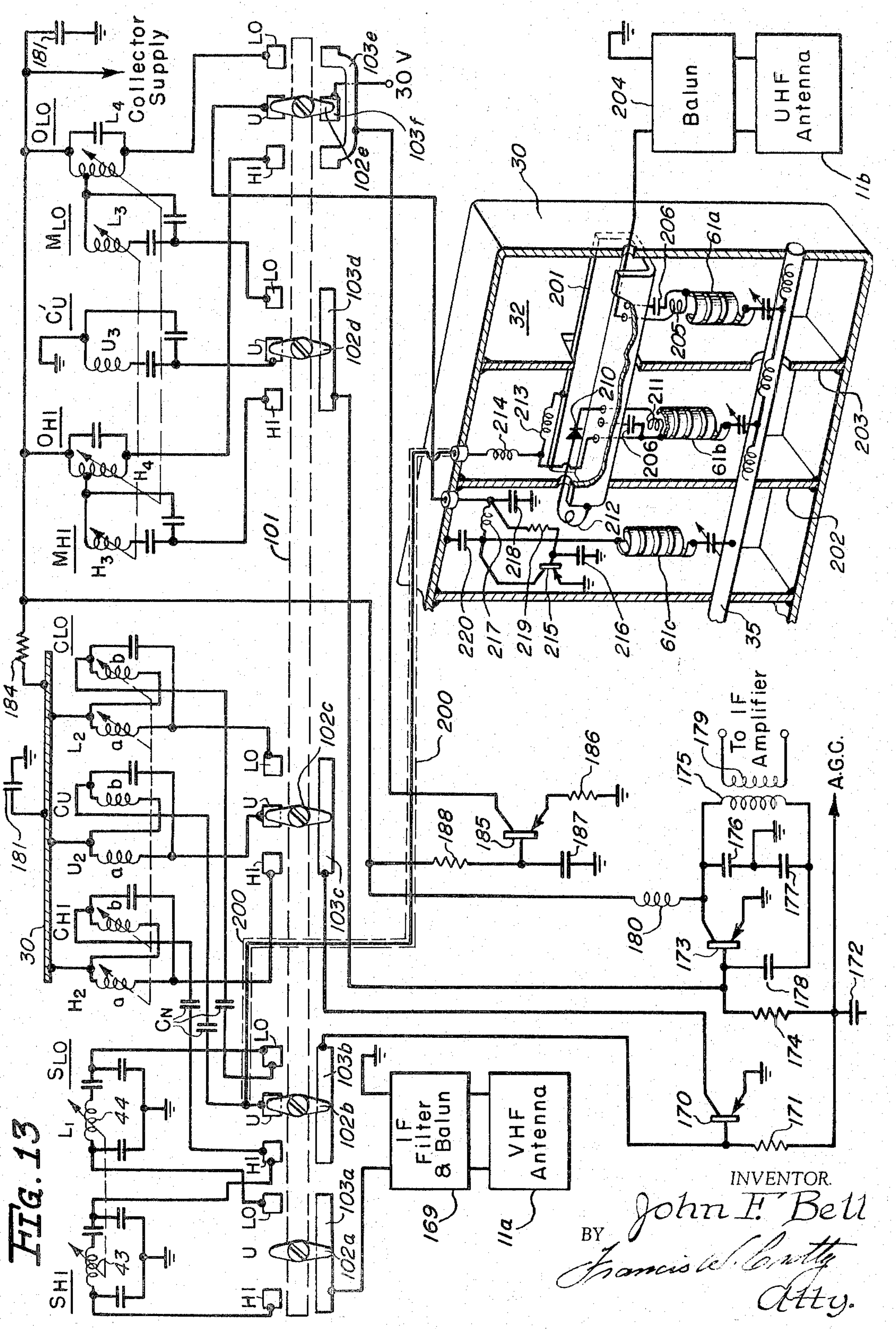

FIGURES 4 and 5 are detailed views of the VHF and UHF tuner taken along section lines 4—4 and 5—5, respectively, of FIGURE 3;

FIGURE 5*a* is a view showing various significant positions of the tuning slug of the VHF tuner;

FIGURE 6 is a plan layout of the tuning and switching cam of the tuner mechanism;

FIGURES 7 and 8 are additional detailed views taken along sections 7—7 and 8—8, respectively, of FIGURE 3;

FIGURE 9 shows a switch block included in the tuner assembly;

FIGURE 10 represents the position in the frequency spectrum of the picture and sound carriers of two adjacent television channels;

FIGURE 11 is a circuit diagram of the AFC system of FIGURE 1;

FIGURE 12 represents the response characteristic of the AFC system;

FIGURE 13 is a circuit diagram for the VHF and UHF tuning arrangement;

FIGURE 13*a* is a circuit diagram illustrating the constant bandwidth UHF tuning feature of the invention;

FIGURES 13*b* and 13*c* are curves illustrating the principles of the circuit of FIGURE 13*a*; and FIGURE 14 shows a modification of a portion of the receiver of FIGURE 1.

*Receiver circuitry in general*

Referring now more particularly to FIGURE 1, the television broadcast receiver there represented is of the well-known intercarrier type and is continuously tunable through both the VHF and UHF bands in order to respond to any selected one of the many television signal channels assigned to such bands. In accordance with present specifications of the FCC, the program signal of each channel includes a picture carrier amplitude modulated with video information and a sound carrier frequency modulated with sound information. The maximum deviation of the sound carrier is of the order of 40 kc. and the separation of sound and picture carriers is fixed at 4½ mc. which is the frequency of the intercarrier component developed by the beating of these carriers.

Structurally, the receiver includes a radio-frequency amplifier 10 having input terminals connected to an antenna system 11. Coupled in cascade to the output terminals of amplifier 10 are a converter or first detector 12, an intermediate-frequency amplifier 13 and a unit 14 which may include both the video or picture detector and the customary AGC supply. This supply is connected by way of an AGC bus to amplifiers 10 and 13, and to converter 12 if desired, to accomplish gain control. One output of the video detector is connected through a video amplifier 15 to an image reproducer 16 which is usually a cathode-ray tube. An output of video amplifier 15, selective to the intercarrier component, connects to the audio system, here shown as including a discriminator detector 17, and an audio amplifier 18 which drive a loud speaker 19. The audio system will, of course, include a limiter since the audio information is conveyed as frequency modulation of a sound carrier. A second output of the video detector connects with a sync signal separator 20 having a line-frequency output connected to a line-sweep system 21 and a field-frequency output connected to a field-sweep system 22. The output circuits of these sweep systems connect to appropriate deflection elements associated with image reproducer 16; generally these are magnetic deflection coils. Oscillator 23 is the heterodyning oscillator associated with converter 12.

Units 10–14 constitute signal-translating means which include not only an intermediate-frequency amplifier but also at least one adjustable tuning element for tuning the receiver to any selected one of the available television signal channels. Preferably, individual mechanically adjustable tuning elements are associated with the RF amplifier and/or the antenna input, with the input of converter 12, and with the frequency-determining circuit of oscillator 23 and they are arranged for unicontrolled adjustment for tracking. Suitable structures for these tuning elements will be considered more particularly hereinafter, and a tuning system 24 for actuating them will, likewise, be described subsequently. For present purposes broken-construction line 25 extending from tuning system 24 to units 10, 12 and 23, designates the mechanical unicontrol connection. Operation of the tuning system is under the control of preset devices to be considered hereinafter as well as an AFC supply 26 which has an input connected through a sound IF amplifier 27 from IF amplifier 13 of the receiver. It is preferable that amplifier 27 include a limiter in order that the AFC be protected against undesired amplitude variations. The output circuit of the AFC supply connects to the control circuitry of tuning system 24.

The receiver as thus far described, except for the circuitry and structures employed for tuning, is of well known design and operation. Consequently, a brief statement of operation will suffice.

*General operation*

Through manipulation of tuning unicontrol 25, the receiver is tuned to a desired television channel, whether it be in the VHF or UHF band. The signal thus selected is amplified in amplifier 10 and converted in unit 12 to an intermediate-frequency signal which is further amplified in amplifier 13. Thereafter, the video frequency modulation components and the intercarrier component are developed in the video detector of unit 14. After amplification in amplifier 15, the video components intensity modulate the cathode-ray beam of image reproducer 16. At the same time, the AGC potential developed in unit 14 controls the gain in the preceding stages to the end that the amplitude of the program signal delivered to the video detector remains substantially constant in spite of wide variations in intensity in the received signal.

The detected television signal is concurrently supplied from video detector 14 to separator 20 wherein inter-synchronizing-signal separation takes place and suitable outputs are supplied to synchronize sweep systems 21 and 22. As a consequence, the beam in image reproducer 16 is deflected in a recurring series of fields of parallel lines concurrently with its intensity modulation in order to synthesize an image corresponding to the received signal. The intercarrier component is selected from the output of video amplifier 15 and translated through audio system 17–19 to reproduce the sound portion of the program in conventional fashion.

*Tuning mechanism in general*

The major components of the tuning system, except for the control circuitry, are shown in FIGURE 2 wherein it is apparent that these components lend themselves to a compact package which is very desirable, especially for portable all-channel receivers. There is a housing 30 which is compartmentalized by means of vertically extending transverse wall sections. The housing and its partitions are constructed of conductive metal and they collectively serve not only as an enclosure for the physical portions of the tuner but also as a shield to protect against unwanted radiation either from the tuner components themselves, or by feedback to the antenna of the receiver. Disposed centrally of the housing is a VHF tuner 31 and a UHF tuner 32 is adjacent one side thereof. To the opposite side of the VHF tuner are a group of selectively operable preset tuning devices for individually tuning the receiver to a selected television channel, the selection being made of channels in the UHF or VHF band in accordance with the requirements of the particular installation. Each such preset device, when selected for operation, controls the energization of a bi-directional driving system including a direct-current permanent magnet motor 34 serving as a nulling device. This motor, when energized, drives a tuning shaft 35 to a particular orientation. As will appear, a single revolution of this tuning shaft accomplishes continuous tuning of the receiver over both the VHF and UHF bands in sequence. The shaft may extend to the front panel of the television receiver, a portion of which is indicated by numeral 36, and a channel dial 37, included in the panel, provides, in conjunction with an indicator 38 rotatable with shaft 35, the instantaneous tuning condition or channel selection of the receiver. A selector knob 39 is carried by an auxiliary shaft of the preset devices to permit their individual selection which may conveniently be designated by a scale 40 having numerals identified with the members of the group of preset devices. Before considering the details of channel selection through the several principal components of the arrangement of FIGURE 2, it will be helpful to understand more of the mechanical structure of tuners 31 and 32.

*VHF tuner mechanics*

The VHF tuner has a group of mechanically adjustable tuning elements to be adjusted concurrently until the tunable stages of the receiver are properly conditioned for channel selection. Four such tuning elements are shown in FIGURE 2 and are designated 42. These elements preferably are similar in construction and their description will be given with particular reference to FIGURE 5 which shows the details of one. When considering the function of these several elements in controlling the circuitry of the receiver, subscripts will be employed for further identification.

As illustrated in FIGURE 5, it is convenient to use permeability tuning to cover the VHF band and, since this band is subdivided, it is also convenient to have the inductance of the VHF tuning elements divided between a pair of coils 43 and 44, the former being designed to cover the higher and the latter being designed to cover the lower portion of the VHF band. These coils are coaxially aligned on a common coil form 45 which may be seated in a partition 46 of housing 30. A tuning slug 47 is disposed within coil form 45 and is displaceable therealong to vary its coupling to coils 43, 44 and consequently vary their effective inductance as required to tune the receiver to a selected television channel.

A displaceable member 49 extends across the array of coil assemblies 43, 44 and is mechanically coupled to each of tuning slugs 47 to effect uni-controlled adjustment thereof. Member 49 is carried at the free ends of a pair of pivoted levers 50, only one shown in FIGURE 5. Levers 50 are rotatably or pivotally supported by pins 51 suitably supported within housing 30. Between levers

50, member 49 carries spring fingers 57 to each of which is secured a section 52 of piano wire or other flexible material for providing mechanical coupling between member 49 and tuning slugs 47. An adjusting screw 53 bears against each spring 57 and facilitates establishing a desired rest position for each tuning slug 47 within its coil form 45. One of levers 50 has a cam following portion 54 formed close to, but displaced from, pivot axis 51 and a spring 55 biases lever 50 in a counterclockwise direction, as viewed in FIGURE 5, to maintain cam follower 54 in continuous contact with a cam 56. Rotation of this cam displaces levers 50, member 49 and tuning slugs 47 along a given path. Cam 56 has a fixed radius over much of its surface because movement of lever 50 is required only during tuning of the receiver in the VHF band. As will be explained more particularly hereinafter, tuning across that band is accomplished in approximately 100 rotational degrees of tuning shaft 35 upon which cam 56 is secured. The flat section **56*a* is the active cam surface for displacing tuning slugs 47 through the medium of levers 50. Rotation of cam 56 is under the control of the bi-directional driving system including motor 34. As shown in FIGURE 7, motor 34 is connected through a step-down gear train to drive tuning shaft 35**.

*UHF tuner mechanics*

The adjustable tuning elements of the UHF tuner 32 are three in number and in FIGURE 2 are designated 60. A detail, representing the construction more clearly, is included in FIGURE 4 where it is apparent that each such element comprises a coiled inductor 61 secured at one end to a mounting portion 62 which is secured within housing 30 to make good mechanical and electrical connections therewith. The opposite end of inductor 61 carries a bifurcation 63, the elements of which serve as stationary electrodes of a variable air dielectric capacitor. The rotor 64 of this capacitor is a three element structure which interlaces in the usual way with stator electrodes 63. The rotor elements are contoured to secure a desired tuning characteristic; more particularly, to achieve a uniform frequency change per degree of angular displacement of tuning shaft 35 upon which the rotors are mounted. The tuning characteristic of UHF tuner 32 in terms of frequency change per degree of rotation of tuning shaft 35 preferably matches the characteristic of VHF tuner 31. This is accomplished by appropriately determining the shape of section **56*a* of cam 56 and the linkage system to tuning slugs 47 to the end that the frequency change per degree of displacement of tuning shaft 35** for the VHF tuner is the same as for the UHF tuner.

*Preset tuning mechanism*

Preset tuning of the receiver by means of either its VHF or UHF tuner is under the control of the preset mechanism 33. The preset mechanism includes one preset device for each preset channel selection that is desired. For the case under consideration, as clearly shown in FIGURE 3, there are 8 such devices 70. Since the devices are all alike in construction, they will be described with reference to the representative structure of FIGURE 7.

Each preset tuning device 70, when rendered effective, energizes the driving system including motor 34 to displace tuning shaft 35 to a predetermined position corresponding to the tuning of the receiver to a selected channel. In this process, motor 34 drives the shaft in that direction which represents the shortest travel to the preselected shaft position. More specifically, each preset device includes a cam 71 having two equiangular and space-opposed cam sections **71*a* and 71*b*. A reference section 71*c* and a companion section 71*d* are interposed between cam sections 71*a* and 71*b*. Each such cam is carried in an adjustably fixed position on tuning shaft 35**. While there are a variety of methods of adjustably securing each cam to its shaft, as shown, preferably the cam is split as indicated at 72 and a machine screw 73 is accommodated in a channel-way bridging slot 72. This channel is threaded so that by taking up on screw 73, sufficient friction is developed between the central aperture of cam 71 and shaft 35 to insure that cam 71 normally rotates with the shaft. At the same time, the frictional coupling permits the shaft to rotate with respect to the cam in a manner to be described, as required to set-up tuning devices 70.

Cooperating with cam 71 is the movable blade 74 of a switch for selectively engaging one or the other of a pair of energizing contacts 75 and 76 for bi-directional control of driving motor 34, the direction of rotation being determined by the particular contact against which blade 74 rests. The switch blade is of spring stock and is insulatingly supported from housing 30. Midway of the blade, there is a V-shaped section 77 serving as a cam follower and self biased into engagement with cam 71. Switch contacts 75 and 76 are shown as threaded so that their spacing with respect to the central or reference position of switch blade 74 may be readily adjusted.

During any operating interval in which cam follower 77 transverses cam section 71*b*, switch blade 74 engages contact 76 so that if the energizing circuit to motor 34 is otherwise completed, the motor drives in a particular direction. Conversely, during operating intervals in which cam follower 77 engages cam section 71*a*, the switch blade closes against contact 75 to energize motor 34 for rotation in the opposite direction. However, during intervals in which the cam follower is at the mid-portion of reference section 71*c* of the cam, the switch blade is out of engagement with contacts 75, 76 and the energizing circuits to driving motor 34 through these contacts are open. The arc subtended by this mid-portion of cam section 71*c* represents the allowable frequency change in the tuning of the receiver before the switch blade closes upon one of contacts 75, 76. Preferably, this tolerance is determined by adjustment of the stationary contacts for a frequency deviation which is less than the frequency separation of the picture and sound carriers of the selected television channel relative to those of the neighboring or adjacent television channels. As will be made more clear hereafter, a satisfactory frequency tolerance in view of current specifications of the FCC is 1.5 mc. which, in relation to a desired tuning characteristic of the UHF and VHF tuners, corresponds to a $\pm 1°$ displacement of tuning shaft 35.

A locking disc 80 is provided for each of the tuning cams 71 to permit what is known as set-up, that is, assigning a selected channel to each preset device. FIGURE 3 shows that the locking discs 80 are aligned with their associated tuning cams 71 and are supported on an auxiliary shaft 78 which is disposed in parallel relation to tuning shaft 35. Shaft 78 may have a flat section, indicated in FIGURE 7, so that discs 80 are locked against relative rotation and shaft 78 is supported by end bearings which provide for its rotation and also for a slight displacement in an axial direction. Each disc 80 is generally pear-shaped and a recess or slot 79 is formed therein and proportioned to receive a locking pin 81 which extends radially from its companion tuning cam 71. The engagement of this pin with the locking disc is a requirement for the setting up operation which will be explained hereafter. In the normal position of shaft 78, the portion of disc 80 which accommodates slot 79 is displaced to the right of the locking pin of its associated tuning cam 71, as illustrated in FIGURE 3. This permits the tuning cam to rotate freely. When shaft 78 is displaced to the left as viewed in FIGURE 3 after tuning shaft 35 has been preset to a particular position, the locking pin 81 of a particular tuning cam is enclosed by the slot 79 of its locking disc 80 to prevent relative motion therebetween. Such displacement of shaft 78 may be brought about by pulling selector knob 39 out since this knob is affixed to the selector shaft. The advanced or pulled out position of the knob is shown in dotted outline in FIGURE 3.

The end face of the locking cam next adjacent panel 36 carries a circular array of locking apertures 94, including one such aperture for each member of the group of preselectors. A locking pin 93 projects from housing 30 and for each preselector setting of selector knob 39 is aligned with an assigned one of apertures 94. Consequently, if shaft 78 is displaced to the left, as required in setting up the preselectors to their respective channel assignments, pin 93 enters an aperture 94 and holds discs 80 firmly against rotation.

Selection of any particular member of the group of tuning devices 70 is made by selector knob 39 which controls the rotatable element of a selector switch 85. This switch has a circle of spaced and mutually insulated stationary contacts 86 and leads 87 extend from such contacts to the stationary ends of respectively assigned ones of switch blades 74. The movable contact 88 of selector switch 85 connects by means of a conductive ring 89 to a conductor 90 which leads to the energizing circuits of motor 34. Rotatable contact 88 may selectively engage any of stationary contacts 86 by appropriately positioning the movable contact through selector knob 39, the instantaneous position of the movable contact being shown on scale 40. In this fashion, any of the preset devices may be brought to one side of an energizing circuit from motor 34 through its switch 74–75–76 and through its assigned stationary contact 86 to selector switch 85. The energizing circuit may be completed by conductors connected with contacts 75, 76 if the cam portion 77 on switch 74 is not resting against the reference section 71*c* of the preset cam. FIGURE 9 shows a mounting block for the series of switch blades 74 and indicates a conductor 91 in circuit with contacts 76 and a conductor 92 in circuit with contacts 75.

Since preset devices 70 are intended to make selection in both the VHF and UHF bands, there is a switching mechanism 100 provided for selectively causing VHF tuner 31 and UHF tuner 32 to be operatively connected with the stages of the receiver which they tune, see FIGURE 3. The switch mechanism is also controlled from tuning shaft 35 to condition the VHF and UHF tuners for operation in accordance with the angular orientation of this shaft. Structurally, the switch mechanism comprises a base member 101 of insulating material which is slidably supported within a vertical partition in the portion of housing 30 devoted to the VHF tuner. There are a series of movable switch elements 102 secured transversely of base 101 to engage stationary contacts 103 and 104 through which circuit connections may be extended to the electrical components of the VHF and UHF tuner. This will become more clear from a subsequent consideration of a suitable circuit diagram.

Since it is contemplated that continuous tuning is to be obtained over both UHF and VHF bands in a single rotation of shaft 35, it is necessary to change the circuit connections established by switch mechanism 100 at least twice in a single revolution of the shaft. This is the function of a switching cam track 105 cut in the side face of cam 56 as represented in FIGURE 5. A pivoted lever which is essentially the same as a bell crank is pivotally supported on the housing partition which accommodates switch mechanism 100. One leg 106 of the bell crank terminates in a cam follower 107 which is received by cam track 105. The other leg 108 has a bifurcated termination which receives a pin 109 mounted to base 101 and extending through the housing partition. Rotation of cam 56 oscillates the bell crank and occasions reciprocating motion of base 101 to displace switch elements 102 as required so that each may engage selected ones of the stationary contacts associated with it at the appropriate angular disposition of tuning shaft 35.

FIGURE 6 demonstrates an acceptable pattern for cam track 105. It is developed for a tuning specification in which 260° of rotation of shaft 35 are devoted to UHF tuning while the remaining 100° of rotational displacement are devoted to switching functions. Specifically, cam track 105 has a constant radius over the 260° span and a serpentine contour for the remaining 100°. Also shown in FIGURE 5 is the profile of tuning cam 56 which likewise has a constant radius for 260° and a varying contour for a 100° span to actuate VHF tuner 31. The 100° and 260° segments of the two cams do not coincide, but are displaced relative to one another by approximately 90°. This obtains because of the 90° spacing of cam followers 54, 107 about shaft 35, the axis of rotation of their respective cams 56, 105.

For convenience of description, there is designated along the periphery of cams 56 and 105 the shaft angles for television channels which define the bands in question. The function of cams 56, 105 is best understood by observing the sequence of events that take place as shaft 35 is rotated in a counterclockwise direction through 360°. During an initial 260° displacement of shaft 35 from the position shown in FIGURE 6 UHF tuner 32 is actuated. The sectors of cams 54, 105 traversed during this period are identified by channel numerals 14–83 and, since no VHF tuning or switching is entailed, these sectors exhibit a constant radius.

Thereafter, those sectors of the cams bounded by channel numerals 83–2 and corresponding to a shaft displacement of 18.3° are presented to their respective followers. Since this is a switching interval, the radius of tuning cam 56 remains constant but the radius of cam track 105 decreases uniformly to form an inwardly directed segment SW1.

As cam follower 107 traverses segment SW1, bell crank 106, 108 is caused to rotate in a clockwise fashion, as viewed in FIGURE 3, and displace base 101 of switch mechanism 100 to the right to condition VHF tuner 31 for operation at the low frequency end of the VHF band.

The next sectors of cams 56, 105 to encounter their followers are defined by channel numerals 2–6 and approximate a shaft displacement of 19.5°. During this period of travel the radius of cam 105 remains constant since no switching operation is to take place. The radius of cam 56, however, changes in order to displace follower 54 as required to tune the VHF tuner through the low frequency portion of the VHF band.

The next cam sectors to become effective are those between channel numerals 6–7 and require a shaft travel of approximately 18.3°. No tuning is involved during this period and cam 56 has a constant radius. A switching function is to be performed, however, and consequently cam track 105 has a uniformly increasing radius which defines a switching segment SW2 that shifts bell crank 106, 108 and switch member 101 to the left, as viewed in FIGURE 3. This switching operation conditions VHF tuner 31 for operation in the high frequency portion of the VHF band.

The next increment of both cams is designated 7–13. it is devoted to tuning the high end of the VHF band and corresponds to a shaft displacement of 25.6°. The sector of cam 56 has a changing radius to accomplish tuning while switching cam 105 maintains a constant radius during this period.

The final cam sectors are identified by channel numerals 13–14. They correspond to a switching interval and represent 18.3 rotational degrees. Tuning cam 56 has a constant radius over this sector since tuning does not take place. Cam track 105, on the other hand, has a uniformly decreasing radius which defines a switching segment SW3 for displacing follower 107 to return switching element 101 to its center position to condition the UHF tuner for operation. This description of the cam patterns has proceeded on the basis of a counterclockwise progression but it is a reversible progression and the driving system is bi-directional.

In FIGURE 5*a* there are four views which show important positions of an illustrative one of the perm-tuning slugs 47 under the control of section **56*a* of cam 56. At position I, the slug is fully inserted within coil 44 which is effective at the low portion of the VHF band. For this condition, the coil exhibits its greatest apparent inductance and the receiver is tuned to channel 2. Rotation of cam 56 to present the cam section 2–6 to cam follower 54 withdraws the slug from coil 44 until its other extreme position in reference to the tuning of coil 44** has been attained. This is position II in which there is a minimum coupling between the slug and the coil, the coil has its minimum apparent inductance, and the receiver is tuned to channel 6 which is the upper limit of the low frequency portion of the VHF band.

The next significant position of the tuning slug is designated III. It follows immediately after cam section 6–7 which is devoted to switching. Tuning slug 47 has now attained its greatest penetration within coil 43, increasing to a maximum the apparent inductance thereof and tuning the receiver to channel 7 which is the low limit of the high frequency portion of the VHF band. Further displacement of cam 56 over section 7–13 causes the slug to be withdrawn until finally its position IV has been achieved. The slug now has its minimum coupling with the coil, a condition of minimum inductance and maximum frequency are established, tuning the receiver to channel 13 which is the other limit of the high frequency portion of the VHF band. As indicated above, the incremental displacement of the tuning slug per degree rotation of tuning shaft 35 provides the same tuning slope for both coils 43 and 44 and the UHF tuner.

*AFC system*

The described mechanism is carefully constructed to avoid backlash and also to satisfy as close tolerances as commercially feasible to the end that driving motor 34, in response to the control influenced by any of preset devices 70, is able to orient tuning shaft 35 as closely as possible to the orientation required to select a particular channel within one of the VHF and UHF bands. It is not feasible to have the structure attain that degree of tuning precision that customers have become accustomed to through the fine tuning arrangements of television receivers, particularly, if one bears in mind the economics of the structure and the complications introduced by repeat accuracy. The described structure does however, locate tuning shaft 35 to a radius within ±1° of shaft displacement and further precision in tuning is achieved by frequency control system 26 coupled to the signal-translating channel of the receiver for deriving a control signal which has a polarity and amplitude representing the sense and magnitude of the deviation, if any, in the tuning condition of the receiver from that required to select a chosen channel. The frequency control system is a generally familiar device which monitors a carrier signal to obtain a correcting voltage when its frequency varies from a desired reference value. It could, therefore, operate on either the video or sound carrier available in the receiver. It is preferred to operate on the sound signal. Since the sound is a frequency as distinguished from an amplitude modulation, it has a greater average power than the video signal and is thus more suitable for use in deriving a control voltage. Furthermore, the sound modulation is symmetrical whereas the video modulation is unsymmetrical which is another reason for favoring operation on the sound signal and finally, one is able to couple closely to the IF in deriving the sound component without introducing undesirable transient effects which is not the case if the video signal is selected.

The receiver has been described as of the intercarrier type and such a receiver has an IF frequency characteristic that is shaped to minimize undesirable intermodulation.

In particular, it is common practice to include in the intermediate-frequency amplifier a trap circuit for attenuating the sound intermediate-frequency signal to a low level relative to the video IF signal. This trap is a suitable source for driving AFC system 26 of FIGURE 1. The take-off from the IF amplifier may include an amplitude limiter and sound IF amplifier 27 feeding the signal input of AFC supply 26. Preferably, the control system has an acceptance bandwidth which is less than the carrier frequency separation of adjacent television channels in order to minimize adjacent channel interference in the control circuits.

FIGURE 10 shows a frequency scale for adjacent channels 2 and 3. The letters P and S respectively designate the location in the frequency spectrum of the picture and sound carriers for these adjacent channels. The acceptance band of the AFC system is preferably less than the value $\Delta f$ which is the minimum carrier frequency separation of adjacent channels. Under present specifications of the FCC this separation is 1.5 mc.

A circuit arrangement for the frequency control system is shown in FIGURE 11. As there shown, the system includes a frequency discriminator-detector having an input terminal 115 which connects with the output circuit of sound IF amplifier 27. This input terminal also connects to the high potential side of a parallel resonant circuit 116 tuned to the sound IF frequency of the receiver. The low potential terminal of this tuned circuit is coupled to ground through a by-pass capacitor 117. In usual fashion, tuned circuit 116 is inductively coupled to a similar tuned circuit 118 and a capacitor 119 connects input terminal 115 to the mid tap of the inductance in the last-mentioned tuned circuit. A pair of diodes 120 and 121 connect to opposite terminals of tuned circuit 118 and they have a load circuit provided by a resistor 122 and a capacitor 123. A center tap of resistor 122 returns to the center tap of the inductance of resonant circuit 118 through a radio frequency choke 124. The low potential terminal of load resistor 122 is returned to ground through a by-pass capacitor 125. The output potential developed in the discriminator detector has an amplitude indicative of the departure of the applied signal frequency from the resonant frequency of circuits 116, 118 and the polarity of that potential represents the sense of frequency deviation. This, of course, is conventional discriminator action.

The control potential developed in the AFC system is supplied to means for utilizing that potential to energize the driving system including motor 34 to establish and maintain the receiver tuned to the chosen channel. The means for utilizing the control signal comprises a control circuit including a pair of opposite gender transistor devices 126 and 127. The input electrodes of the transistors connect to the output terminals of the detector; specifically, the base electrodes are connected to one terminal of load circuit 122, 123 and the emitter electrodes connect through emitter resistors 128 and 129 to the opposite terminal of the detector load circuit. The output circuit of transistor 126 constitutes an energizing circuit for causing motor 34 to drive the tuning system in one direction which for convenience is designated R or right hand. This output circuit includes a winding of the motor and a potential source shown as a rectifier 130 and a condenser 131 coupled across supply terminals 132 which may conveniently connect to the 6.3 volt A.C. heater supply of the receiver. The output circuit of transistor 127 includes an excitation winding of motor 34, and a potential supply comprising a rectifier 133 and capacitor 134 similarly connected to terminals 132. This last described circuit energizes the motor for rotation in the opposite direction designated L or left hand.

It is desirable to protect transistors 126 and 127 from burn out that may otherwise be occasioned by an excessive voltage applied to the transistors from the discriminator detector. This is accomplished by means interposed between the detector and the input electrodes of the transistors to limit their excitation to a predetermined maximum. It is convenient to employ a pair of semi-conductor diodes 136 and 137 connected with opposed polarities across the output terminals of the detector as a voltage limiter. The breakdown potential of silicon diodes, for example, is about .7 of a volt and, therefore, the voltage excursions from the detector, as applied to transistors 126 and 127, are limited to $\pm .7$ of a volt. The discriminator characteristic of voltage output against frequency deviation is represented in FIGURE 12. The frequency $f_r$ is the mean or reference frequency at which the detector output is zero. A typical discriminator output characteristic includes the high amplitude curve shown in broken construction line, but the characteristic due to the limiting influence of diodes 136 and 137 is that shown in full construction line. The effective bandwidth of the AFC system is about 1½ mc. as shown by the dimension line in FIGURE 12.

*AFC override feature*

A particular feature of the invention is the provision of means, in addition to the frequency control system, for restricting the deviation in tuning of the receiver to a value less than the adjacent channel frequency separation. That is to say, an additional device which prevents the frequency deviation from exceeding the 1.5 mc. range indicated in FIGURE 12. Structurally, this is an arrangement which, in effect, overrides the control of the AFC detector when the deviation represented by mistuning is outside of the 1.5 mc. range. The override circuit is also shown in FIGURE 11 and includes a resistor 140 which connects from one side of potential supply 130, 131 to terminal 76 by way of conductor 91. A motor circuit through resistor 140 will be completed if the position of tuning shaft 35 causes switch blade 74 to close against contact 76. In that event, the energizing circuit for the motor is extended through switch blade 74 and conductor 87 to the stationary terminal of selector switch 85 which is instantaneously effective. From the stationary terminal of the selector switch the circuit is continued through the movable blade 88 of the switch and conductor 90 to the base electrode of transistor 126. Should that circuit be closed, motor 34 is energized to drive the tuning shaft in a direction that restores blade 74 to its normally open condition. A companion circuit to limit or compensate frequency deviations in the opposite direction from the desired channel frequency includes a resistor 141 which connects from one terminal of voltage supply 133, 134 over conductor 92 to stationary contact 75. This circuit is completed, in the event that the tuning deviation causes switch blade 74 to engage contact 75, through selector switch 85 to the base of transistor 127.

*Manual tuning*

In addition to the motor control of tuning shaft 35, which is imposed by preset devices 70 and AFC supply 26, it may be desirable to permit manual tuning. A provision has been made for manually closing energizing circuits for driving motor 34 as well as a manually operable drive for shaft 35. For manual control of tuning shaft 35 through motor 34 there is provided one contact in the circle of contacts of selector 85 having the designation M in FIGURE 2. If selector knob 39 is positioned to this terminal, its movable blade 88 contacts terminal M in the circuit diagram of FIGURE 11. With selector 85 so adjusted, right hand excitation of motor 34 may be achieved by closing switch 145 or alternatively, left hand excitation may be accomplished by closing switch 146. These switches are available on the panel of the receiver just above selector 39 as shown in FIGURE 2.

All stationary terminals of selector switch 85, with the exception of terminal M, connect with an assigned one of switch blades 74 included in the preset devices. Since there is no such blade associated with terminal M, the cams of the preset devices are ineffective in this manual control of the tuning through switches 145 and 146. For convenience in the drawing, only one blade 74 and contact pair 75, 76 are shown connected to a terminal of the selector switch 85, but it will be understood that there is a similar switch blade and contact pair for all such contacts other than contact M.

For manually operated mechanical adjustment of tuning shaft 35, there is a clutch having a rotatably supported element 150 and a rotatable axially movable element 151. Clutch part 150 is mechanically connected to the gear train through which motor 34 drives tuning shaft 35 as illustrated in FIG. 3. Clutch part 151 is carried by a shaft 152 which may extend out the back of the television cabinet and terminate in a knob (not shown). A coil spring 153 biases clutch part 151 out of engagement with clutch part 150 but its bias may be overcome by depressing the control knob to advance shaft 152 and cause the elements to engage. Thereafter, manual rotation of shaft 152 results in driving tuning shaft 35.

The channel indicator 38 is mechanically coupled to a gear 155 in the train through which motor 34 or clutch 150, 151 drives tuning shaft 35. Consequently, the indicator always denotes the instantaneous position of the tuning shaft in terms of channel section as it travels dial 37.

*Remote control tuning*

The description thus far explains the manner in which selector 39 may be manipulated to choose one of the preset devices 70 and tune the receiver to the television channel to which that device has been assigned, and it further explains how tuning to any channel may be undertaken by manual control of driving motor 34 or even by manual displacement of tuning shaft 35 through clutch 150, 151. Still another mode of tuning is possible with this structure, namely, tuning by remote control. If a remote control unit is provided to step selector knob 39 from one position to the next, tuning will take place in the same way as results from manual actuation of selector knob 39. A suitable remote control unit currently employed in commercial television receivers is described and claimed in U.S. Patent 2,817,025, issued on December 17, 1957, in the name of Robert Adler, and assigned to the same assignee as the present invention.

The remote control of the Adler patent operates on an ultrasonic principle and features an entirely mechanical, hand-held ultrasonic transmitter which is finger actuated to direct a command to a receiver. At the receiver, the command is converted to an electrical signal having a frequency which denotes the control function to be carried out and frequency selective relays respond for that purpose. Among other things, one frequency may be chosen to energize a driving motor to rotate in one direction and a different frequency be employed to energize the motor for rotation in the opposite direction. Such a motor is shown at 160 in FIGURE 2, and through a suitable gear train, may drive a gear 161 which is mounted on the same shaft as selector discs 80. The grilled aperture 162 in panel 36 of the receiver denotes the microphone that is used to accept an ultrasonic command signal and convert it into an electrical signal of like frequency. The stages of amplification, frequency discrimination and relays, etc., which constitute the remainder of the remote control amplifier are fully disclosed in the Adler patent and have been omitted to avoid unnecessary complication of the present disclosure.

*VHF tuner circuitry*

It is appropriate, however, to illustrate suitable circuitry for both the VHF and UHF tuners and that circuitry is the subject of FIGURE 13. In order to have more complete identification of circuit components which have heretofore been discussed as a group, the technique of subscript letters has been adopted. For example, the movable switch blades for rendering the VHF and UHF tuners selectively operable in relation to the remainder of the receiver are identified as **102*a*–102*b*, inclusive. In similar fashion, one set of stationary contacts has been identified 103*a*–103*f*, inclusive. Each switch element 102 is normally in continuous engagement with an associated stationary contact 103** and has any of three operating positions. The first is at the extreme left as viewed in FIGURE 13 and has been identified as HI which is intended to means the high portion of the VHF band. The center position is designated U and is the switch location for UHF reception. The third position which is at the extreme right end of the travel of each switch element is designated LO to signify the low portion of the VHF band.

In addition to the switching mechanism, the circuit includes a VHF antenna **11*a* which is connected through an IF filter and balun 169 to contact 103*a*. The filter is to minimize radiation of oscillator signals from the receiver and also to protect the receiver against interference outside the television bands such as police signals. The balun component serves to couple between a balanced antenna and an unbalanced selector input with impedance matching. The connection from contact 103*a* may be extended to either of two preselectors $S_{HI}$ and $S_{LO}$ which are generally similar in construction. Each of preselectors $S_{HI}$ and $S_{LO}$ comprises an adjustable inductor coil 43 and coil 44**, respectively, and a series connected capacitor constituting a variably tuned series resonant circuit. The shunt capacitors at opposite terminals of the series network provide impedance matching. Preselector $S_{HI}$ is effective for tuning over the high portion of the VHF band and selector $S_{LO}$ is effective for tuning over the low portion of that band. In tuning to receive any particular channel, the preselector is adjusted for series resonance at the mid-frequency of that channel.

To the right of the preselectors in FIGURE 13 are represented three similar parallel tuned coupler networks $C_{HI}$, $C_U$ and $C_{LO}$ which function for reception at the high portion of the VHF band, at the UHF band, and at the low portion of the VHF band, respectively. Each has a bifilar winding tuned by a capacitor. Each network also includes a neutralizing capacitor $C_N$ which is connected between one terminal of the network and a fixed contact associated with switch blade **102*b***. Tuned circuit $C_U$ is fixed tuned to the IF frequency of the receiver, but the other two are part of the VHF tuner and are tunable.

Proceeding further to the right in the circuit diagram of FIGURE 13, there are two tunable circuits $M_{HI}$ and $M_{LO}$ to serve as inputs to a mixer. Each of these comprises an adjustable inductor tuned by a pair of series connected capacitors. Tuned circuit $M_{HI}$ is inductively coupled to tuned circuit $C_{HI}$ while tuned circuit $M_{LO}$ is inductively coupled with tuned circuit $C_{LO}$.

Mixing in a superheterodyne receiver, of course, requires locally generated oscillations and the circuit in question shows a pair of tank or frequency-determining circuits $O_{HI}$ and $O_{LO}$ for the local oscillator. Each has a tunable inductor and oscillator injection into the mixer circuit is effected by connecting one terminal of each mixer input to a tap on the companion oscillator tank circuit as represented by the connections of circuits $M_{HI}$, $O_{HI}$ and $M_{LO}$, $O_{LO}$. Positioned between the two tank circuits of the oscillator is a tuned circuit $C'_U$ resonant to the intermediate frequency of the receiver because for UHF operation the mixer stage functions as an IF amplifier and the oscillator employed for VHF reception is disabled.

At the lower left portion of the diagram there is represented a transistor 170 which functions as an RF amplifier during VHF reception and as an IF amplifier during UHF reception. Its base electrode connects to the AGC bus through a resistor 171 and capacitor 172 is an AGC filter. Transistor 173 is the mixer and its base is connected to the AGC bus through a resistor 174. The output circuit connected to the emitter and collector of mixer 173 is tuned to the intermediate frequency of the receiver and comprises an inductor 175 across which are connected two capacitors 176 and 177. Their common terminal is grounded as is the emitter of the transistor. A neutralizing capacitor 178 connects from the base of transistor 173 to its tuned collector circuit. An output coil 179 inductively coupled to coil 175 delivers the intermediate-frequency signal from the output terminals of the mixer to the intermediate-frequency amplifier of the receiver. A choke 180 connects the collector to a voltage supply which extends from a source labeled "collector supply" through a resistor 184 to housing 30 and bypassed by a capacitor 181.

Transistor 185 is included in the oscillator and its emitter is isolated from ground by a resistor 186. Its base is connected to ground through a capacitor 187 and through a resistor 188 to the common terminal of choke 180 and resistor 184.

During any operating interval in which switch mechanism 100 is activated by cam 105 for the reception of a channel in the high portion of the VHF band, the movable switch elements 102 assume their extreme left hand position of FIGURE 13. For this switch setting, preselector $S_{HI}$ connects the VHF antenna to the input or base circuit of RF amplifier 170. At the same time, coupler $C_{HI}$ is connected to the output or collector electrode of this transistor and the stage is neutralized by the effect of one of the neutralizing capacitors $C_N$. The signal applied to amplifier 170 is that to which preselector $S_{HI}$ is tuned by cam 56. The amplified signal is applied to input circuit $M_{HI}$ of mixer 173 by its coupling to network $C_{HI}$. The tuned input $M_{HI}$, for this condition, is connected by switch element **102*d* to the base of mixer 173. Also switch element 102*e* connects oscillator tank $O_{HI}$ to the collector circuit of transistor 185 and, in view of the uni-controlled tuning of networks $S_{HI}$, $C_{HI}$, $M_{HI}$, $O_{HI}$ local oscillations are generated and concurrently supplied to mixer 173 to the end that an amplified television signal representing the selected channel but having a frequency corresponding to the intermediate frequency of the receiver is made available at the output 179**.

The same type of circuitry is effective when switch mechanism 100 displaces movable elements 102 to their extreme right hand positions, but in this case the effective tuned networks are preselector $S_{LO}$, tuned output $C_{LO}$ for amplifier 170, mixer input $M_{LO}$ and oscillator tank $O_{LO}$. Again, the output at the intermediate frequency is available at the terminals supplied by coil 179.

It will be observed that oscillator injection in the mixer circuit takes place by arranging that a portion of the inductance of the effective tank circuit of the local oscillator is in series with the resonant network connected to the base electrode of mixer 173. This has particular advantage in that it tends to provide constant injection independent of tuning frequency and also since the injection voltage is not developed in the resonant circuit included in the input of the mixer, the possibility of undesirable feedback to the VHF antenna is minimized.

The third position of switch mechanism 100, which locates movable elements **102*a*–102*e* to the center position illustrated in FIGURE 13, disconnects VHF antenna 11*a* and balun 169 from operative association with amplifier 170. Switch element 102*b* applies an IF input signal to the base of amplifier 170, this signal being delivered from the output of the UHF tuner by way of a coaxial link 200 which connects with contact U associated with switch element 102*b*. At the same time, switch element 102*c* connects network $C_U$, which is tuned to the same IF frequency, to the collector of amplifier 170. The input of transistor 173 is now connected through switch element 102*d* to a similarly tuned network $C'_U$. Therefore, transistors 170 and 173 are conditioned to function as IF amplifiers. It will be observed that switch element 102*e* no longer connects a tank circuit to transistor 185 and, therefore, this local oscillator is disabled for UHF reception. The particular setting of switch element 102*e*** is used to apply an operating potential from a 30 volt source to the local oscillator of the UHF tuner, the circuitry of which is now to be considered.

*UHF tuner circuitry*

The portion of housing 30 which accommodates this tuner is illustrated in FIGURE 13 in which it is apparent that there are, in addition to the several vertical partitions, a length of U-shaped channel 201 which is in mechanical and electrical connection with an end wall of the housing enclosing the UHF tuner and also its vertical partition 202 but it passes through partition 203 without contacting it. The tuning shaft 35 is similarly arranged, making electrical connections with the same partitions as channel 201 and being free of partition 203. This tuner has a UHF antenna **11*b* which is connected through a balun 204 to an antenna tuned circuit by means of a coil 205**.

It was explained in connection with FIGURE 4 that each of the three tunable circuits of the UHF tuner has an inductive element 61 and a variable capacitor including stationary electrodes 63 and interleaving movable electrodes 64 which are mounted upon and rotate with tuning shaft 35. These same elements are represented symbolically in FIGURE 13, but in order to avoid confusion they have been designated **61*a* for the antenna tuned circuit, 61*b* for the mixer tuned circuit and 61*c* for the local oscillator. Instead of repeating the structural diagram of the rotatable condenser, the symbol for a variable condenser has been adopted in this schematic. The end of each inductor 61*a* and 61*b* opposite that which connects to the tuning capacitor is connected by a capacitor 206 to the grounded channelway 201**.

The mixer stage includes a diode 210 physically located within channel 201. One terminal of the diode connects with a coil 211 which is coupled to inductor **61*b* and is returned to ground through capacitor 206. Consequently, the mixer and preselector are coupled to their respective terminations by both inductive and capacitive coupling. The other terminal of the diode connects to an injection coil 212 which is physically positioned within the compartment devoted to the local oscillator and inductively coupled to oscillator coil 61*c*. Capacitor 206 and inductor 213 provide the load circuit for mixer 210 which is tuned to the intermediate frequency of the receiver and a connection is taken from this circuit through an RF choke 214 to the coaxial link 200 leading to the contact U which may be engaged by switch element 102*b* of switch mechanism 100. Of course, the IF output is insulated from housing 30**.

The local oscillator has, in addition to its tank circuit including inductor **61*c*, a transistor 215. Its base is connected to ground through a capacitor 216 and a collector voltage is applied through an RF choke 217 which connects with a lead extending through, although insulated from, housing 30, to terminal U which may be engaged by switch element 102*e*. This lead may connect through a feed-through capacitor to be bypassed to ground as indicated by a capacitor 218 and a resistor 219 connects between choke 217 and the base electrode. The collector is also coupled to tank circuit 61*c* through a capacitor 220. The oscillator is essentially a tuned collector type and is tunable concurrently with the antenna tuned circuit 61*a* and the mixer tuned circuit 61*b*** in the manner necessary to achieve tracking.

The UHF tuner is arranged for constant bandwidth over the UHF spectrum. This desirable attribute will be explained with reference to FIGURES 13*a*–13*c*. The circuit of FIGURE 13*a* is a representation of those components of the antenna tuned circuit and mixer tuned circuit which are of dominant importance in the matter of bandwidth. Since tuning shaft 35 is in circuit connection with the partitions of housing 30, but is insulated from partition 203, signal currents traverse the shaft. The contribution of the shaft to the circuitry may be represented as a pi network of inductors as suggested by the coils in the appropriate positions on shaft 35 in FIGURE 13, but it is more appropriate to replace the pi by the equivalent T network of inductors in which $L_{M2}$ is the mutual inductance contributed by shaft 35. For like reasons $L_{M1}$ of the other T network represents the mutual coupling contributed by channelway 201, which is similarly connected to the tunable circuits **61*a* and 61*b* and to the partitions of housing 30. If the antenna and mixer tuned circuits are unloaded, that is, have very small coupling to the antenna 16 on the one hand and to mixer circuit 213** on the other hand, the frequency response curve of FIGURE 13*b* obtains. If the Q's are 500 or more, it may be shown that the peak separation $\Delta f'$, which is the 1 db bandwidth with loading adjusted for equal Q and critical coupling, varies with frequency. Obviously, this is undesirable where constant bandwidth is to be achieved. It is found that as tuning shaft 35 displaces the rotors of the variable condensers to tune to higher and higher frequencies, less current returns through T network $L_{M2}$ and practically none returns through this path at the high end of the UHF band, although this is a very significant current path at the low end of that band. At the same time, network $L_{M1}$ is of consequence at the high end of the UHF band but has much less effect at its low end. Accordingly, proportioning of the mutual reactances $L_{M1}$ and $L_{M2}$ permits the peak separation $\Delta f'$ to be substantially constant over the UHF band. The parameters available for proportioning these reactances include the dimensions employed for shaft 35 and channelway 201 as well as the points of connection to these components from the mixer and antenna tuned circuits.

A preferred method of terminating the antenna and mixer tuned circuits is schematically represented in FIGURE 13*a* and entails inserting constant reactances $X'$ and $X''$ in series with the antenna and mixer tuned circuits, respectively. Antenna 116 and mixer 210 constitute a pair of resistive terminations shunted across reactances $X'$ and $X''$, respectively. This arrangement provides constant series resistance in each tuned circuit which, for capacitively tuned circuits of the type herein considered, results in a Q proportional to frequency, that is, it provides critical damping with constant bandwidth.

In FIGURE 13*c*, full line curve $X_L$ shows the reactance contributed by the mutual coupling between inductor **61*a* and inductor 205 in the antenna tuned circuit and is also representative of the reactance due to the mutual between inductor 61*b* and loop 211 in the mixer tuned circuit. The significant capacitive reactance in each tuned circuit is contributed by condensers 206 and the variation of this capacitor with frequency is shown by curve $X_C$. If the terminals of the loops 205 and 211 are properly poled, thereby causing the inductive coupling to aid the capacitive coupling due to capacitor 206, a variation of inductive reactance as shown by broken-line curve $-X_L$ obtains. The resultant effective mutual reactance is then represented by the dash-dot curve X. This resultant mutual may be controlled as to be substantially constant over the UHF band by appropriate proportioning of the inductive and capacitive components of the circuit. To obtain optimum results, the reactance of capacitor 206 in each tuned circuit should be selected or adjusted to produce a $\Delta f$ equal to one-half the desired 1 db bandwidth. Since the coupling reactance of the UHF tuned circuit include both conductive and capacitive components in series, they are proportioned to obtain a Q in each tuned circuit proportional to frequency over the UHF range. Additionally, capacitors 206 aid in tracking. The capacitor 206 in the mixer circuit in conjunction with conductor 213 provides the IF load. Capacitor 220 in the oscillator section of the tuner is the counterpart of capacitor 206** in the antenna and mixer circuits and also is employed for tracking.

*Preset tuning operation*

By way of review, the operation of the arrangement will be outlined with respect to the various forms of tuning to which it lends itself, including the process for setting up the station assignments of the family of preset devices 70.

If it be assumed that the preset devices have been properly set up, selector knob 39 is rotated to the position that represents a channel to be received. This is in the numbered positions of the knob as distinguished from position M which is for manual tuning.

Displacing knob 39 to a chosen one of its prepared positions brings movable contact 88 of selector switch 85 into engagement with stationary contact 86 connected to the switch blade 74 of the chosen preset device. Since tuning shaft 35 is not at the moment in the correct angular aspect to select the desired channel, cam follower 77 of the switch blade rides on either the low section **71*a* or high section 71*b* of cam 71 of the preset device which is instantaneously effective. Under these conditions, blade 74 engages either contact 75 or contact 76 to close an energizing circuit for motor 34 and rotates tuning shaft 35 in the direction which causes cam 71 to present its reference section 71*c* to cam follower 77 by way of its shortest travel. When reference section 71*c* is brought to its home position, the energizing circuit for motor 34 is interrupted and the motor drive stops. Of course, if the home position is passed due to momentum, switch blade 74 engages the other of contacts 75, 76 to drive shaft 35** in the opposite direction and restore the home position. The receiver is now fairly closely tuned to receive the desired channel.

The received signal is converted in converter 12 to an intermediate-frequency signal and utilized in the usual way to cause image reproduction. The sound IF component is derived from IF amplifier 13 and, after limiting and further amplification, is supplied to AFC system 26. A control voltage is obtained in the discriminator detector of the AFC system and by selectively energizing motor 34 causes tuning shaft 35 to be precisely controlled to the orientation for finely tuned reception of the desired signal channel. This optimum tuning condition is maintained thereafter by the continuous monitoring of the sound IF signal in the AFC system.

If an interfering signal tends to disturb the tuning condition, it is not able to cause a deviation which exceeds approximately $\pm 1°$ of rotation of shaft 75. Any displacement in excess of that amount results in cam follower 77 riding off the home portion of the reference section **71*c* of the tuning cam with consequent energization of tuning motor 34 through contact 75 or 76. Should that happen, the energizing circuit for the motor, which is completed through switch blade 74, overrides the influence of the AFC system to restore tuning shaft 35** within a very narrow range wherein the AFC system is able to re-establish and retain precise tuning. Since the acceptance bandwidth of the AFC system is less than the carrier separation of adjacent channels, there is little, if any, adverse effect due to adjacent channel interference.

In some instances, selector knob 39 is adjusted to change the tuning from one channel in the low portion of the VHF band to another channel in that same portion of the same band. Where such is the case, the receiver is tuned to the new channel in the manner described and the only significant adjustment in the tuning mechanism is the displacement of slugs 47 relative to coils 44 under the control of cam section **56*a*. That is to say, it is only necessary to adjust the resonant frequencies of those tuned networks of FIGURE 13 which are effective in receiving the signal in this sub-band of the television frequencies. All such networks are uni-controlled by cam 56**.

On other occasions, it may be that adjustment of knob 39 reflects a change in channel selection from one in the low portion of the VHF band to another in the high portion of that band. Here, again, the procedure is essentially as outlined except that in this case, cam follower 107 is displaced by cam track 105 to actuate switching mechanism 100 which removes coils 44 from operative association with the receiver and substitutes in their places coils 43. After the switching has been accomplished, the now effective coils 43 are appropriately tuned, simultaneously, so that the preselector, the mixer and the oscillator stages are adjusted for the selection of the desired signal.

In like fashion, the adjustment of selector knob 39 may represent a choice from a channel in the VHF band to one in the UHF band. Under that circumstance, cam track 105 by operating follower 107 causes the actuation of switch mechanism 100 which disables the VHF tuner and renders the UHF tuner effective in controlling the receiver. The circuit arrangement for this operating condition is the one illustrated in FIGURE 13. Having caused the UHF channel to be operably associated with the tunable stages of the receiver, continued operation of driving motor 34 in displacing shaft 35 uni-controls the preselector, the mixer and the oscillator circuits of the UHF tuner as required to select the desired UHF channel. It will be noted, however, that in this operation the stages which had served as RF amplifier and mixer during VHF reception now function as additional stages of IF amplification for amplifying the output signal obtained from the UHF tuner.

*Setting-up procedure*

The assigning of particular television channels to each of preset devices 70 is known as the "setting-up" process which is easily carried out in the described apparatus. If it be assumed that one wishes to make a particular channel assignment to the second preset device, selector knob 39 is adjusted to position No. 2. Immediately, the procedure described above is carried out by the tuning system and tuning shaft 35 is precisely adjusted to the angular orientation represented by the instant setting of the particular preset device in question. When this condition has been attained, selector knob 39 is pulled out shifting the group of discs 80 to the left as viewed in FIGURE 3. Locking pin 93 is received in one of apertures 94 in end disc 80 at the left of the group. The pin fits snugly within the locking aperture and restrains the group of locking discs against movement. At the same time, the shift of the locking discs causes slot 79 of the locking disc for the number 2 preset device to encompass locking pin 81 of the tuning cam 71 associated with this preset device. In short, the disc and its associated cam are locked against movement. Tuning shaft 35 is now rotated manually to precisely tune in the specific channel that is to be assigned to the number 2 preset device. After this manual tuning has been completed, selector knob 39 is pushed in restoring the group of locking discs 80 to their normal position. This releases the locking engagement of both pin 93 and slot 79 which releases the mechanism for its normal use in tuning the receiver.

The same process is followed in adjusting each of the preset devices to cause the receiver to be able to quickly and precisely receive predetermined television channels merely upon the proper positioning of selector knob 39. It is, of course, not necessary that successive numbered positions of the selector knob represent channels selected from the same frequency band. There may be an orderly or totally irregular assignment of UHF and VHF channels to successive positions of the selector, since each preset device operates independently of the others in controlling the receiver to receive a preselected channel. However, a minimum time for selecting a channel by remote control is achieved if the channel assignment is in the order of increasing frequency.

*Manual and remote operation*

It is not necessary to use selector knob 39 in tuning the receiver; it may be tuned manually or even by remote control. Push buttons 145 and 146 may be activated manually to control drive motor 34 for adjusting tuning shaft 35 to a chosen signal position. Or, manual rotation of shaft 152, after first having advanced this shaft to couple clutch elements 150 and 151, will tune the receiver by direct manipulation of shaft 35, that is to say, displacement of the shaft without the aid of motor 34.

By the same token, command signals transmitted to microphone 162 in the manner described in the above-identified Adler patent may cause control motor 160 to step selector 39 to a specific position for remote control of tuning.

If desired, an audio output signal may be taken from load circuit 122, 123 of the discriminator detector of the AFC system and supplied through appropriate audio amplification to loud speaker 19, replacing units 17 and 18 of FIGURE 1. Since the discriminator detector demodulates frequency modulation, it will demodulate the sound carrier component that is supplied to the AFC system and that is why sound takeoff is possible from the AFC system. The frequency deviation of the sound carrier of a television broadcast is approximately 40 kc. and this frequency range is within the central sloping portion of the discriminator characteristic of FIGURE 12. Consequently, even through the discriminator does have flattened portions due to the influence of limiting diodes 136, 137, the restriction takes place at frequencies sufficiently removed from the mean frequency of the intercarrier component that there is no wiping out or destruction of the frequency modulation representing sound. The present of the demodulated sound has no adverse effect on the AFC system because it is, in effect, filtered out by motor 34 due to is own inertia and momentum which contribute an integrating effect.

In describing the setting up operation, it was pointed out that tuning shaft 35 is rotated manually until the station desired to be assigned to a particular preset device has been tuned in. Since the receiver is continuously tuned over both UHF and VHF bands, the picture carrier may be supplied to the AFC system which will respond and attempt to maintain tuning in terms of the video as distinguished from the sound IF component. This is overcome by the operator continuing rotation of tuning shaft 35 until conditions are appropriate and the sound IF signal replaces the video as an input to the AFC supply. The operator will recognize the first mentioned condition because of the absence of sound, but it may be desirable to include means coupled to the video or audio system for deriving a control effect and for using the control effect to disable the other of these systems during operating intervals in which the tuning deviation of the receiver exceeds a predetermined amount. More particularly, and as shown in the embodiment of FIGURE 14, it is desirable to derive a control signal from the audio system in response to the intercarrier component and to use that control signal to enable or render operative frequency control system 26. In this case, sound IF amplifier 27 has a bias which normally renders the amplifier non-conductive and interrupts the signal input of AFC system 26. When the receiver has been approximately tuned to a channel, an intercarrier component is present in the audio system which is here shown to include an intercarrier filter 230 coupled to the output of video detector 14. The filter supplies an amplifier 231 and a limiter 232, the output of which may connect to discriminator 17 in an audio system of the type represented in FIGURE 1. If the limiter be of the saturation type, a voltage increase will be experienced in the cathode circuit when the intercarrier component is present and this voltage may be used to overcome the bias of sound amplifier 27 to render the amplifier conductive and supply the sound IF component to AFC system 26. In other words, in this modification, the AFC system is only rendered effective when the tuning conditions are sufficiently close to result in an intercarrier component in the sound channel of the receiver. Accordingly, the AFC system will no longer attempt to lock on to the video IF component and this source of possible ambiguity to the user is eliminated.

The practice of detuning is often times resorted to, especially in fringe areas where interference results in an undesirable contribution of snow in the reproduced picture. By detuning or reducing the bandwidth, it is possible to reduce the noise with a resulting improvement in the reproduced picture. The described arrangement permits of this practice because tuning shaft 35 may be manually manipulated as previously described. Alternatively, reactances may be introduced to modify the IF frequency response characteristic. Of course, detuning may be desirable for one channel, but not for others, and therefore, such reactances would be associated with switches to be rendered effective by the individual preset devices 70. Detuning, of course, may also be accomplished by changing the tuning of the discriminator in the AFC system or by the addition of a bias voltage in the detector circuit to shift the zero potential of the system in terms of frequency.

The described arrangement has been constructed and found to provide an attractive all-channel tuning arrangement for a television receiver. It has the desired flexibility in that tuning may be manual, remote or even preset and precise tuning is achieved with each mode. There is no requirement for the usual form of a vernier or fine tuning control because precision of tuning is established by the AFC system once a channel has been approximately tuned in and precise tuning is maintained thereafter especially in view of the restriction imposed by the override system on detuning caused by interference.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A tunable television broadcast receiver comprising:
signal-translating means including at least one mechanically adjustable tuning element for tuning said receiver to any selected one of a plurality of television signal channels;
a displaceable member mechanically coupled to said tuning element to effect adjustment thereof;
a bi-directional driving system for driving said member;
a selective'y operable preset tuning device for energizing said driving system to displace said member to a predetermined position corresponding to the tuning of said receiver to a selected one of said signal channels;
a frequency control system coupled to said signal-translating means for deriving a control signal having a polarity and amplitude representing the sense and magnitude of the deviation, if any, in the tuning condition of said receiver from that required to tune to said selected signal channel;
and means for utilizing said control signal to energize said driving system to establish and maintain said receiver tuned to said selected signal channel.

2. A tunable television broadcast receiver comprising:
signal-translating means including at least one mechanically adjustable tuning element for tuning said receiver to any selected one of a plurality of television signal channels;
a member displaceable along a given path and mechanically coupled to said tuning element to effect adjustment thereof;
a bidirectional driving system for driving said member along said path;
a selectively operable preset tuning device for energizing said driving system to displace said member in the direction along said path representing the shortest travel to a predetermined position which corresponds to the tuning of said receiver to a selected one of said signal channels;
a frequency control system coupled to said signal-translating means for deriving a control signal having a polarity and amplitude representing the sense and magnitude of the deviation, if any, in the tuning condition of said receiver from that required to tune to said selected signal channel;
and means for utilizing said control signal to energize said driving system to establish and maintain said receiver tuned to said selected signal channel.

3. A tunable television broadcast receiver comprising:
signal-translating means including at least one mechanically adjustable tuning element for tuning said receiver to any selected one of a plurality of television signal channels;
a rotatable member mechanically coupled to said tuning element to effect adjustment thereof;
a bi-directional driving system for rotating member;
a selectively operable preset tuning device for energizing said driving system to rotate said member to a predetermined angular position corresponding to the tuning of said receiver to a selected one of said signal channels, said preset device including a cam rotatable with said member and having two equiangular and space-opposed cam sections, a pair of energizing contacts for bi-directional control of said driving system, and a cam follower engaging said cam and selecting between said energizing contacts in accordance with the instantaneously effective one of said cam sectors;
a frequency control system coupled to said signal-translating means for deriving a control signal having a polarity and amplitude representing the sense and magnitude of the deviation, if any, in the tuning condition of said receiver from that required to tune to said selected signal channel;
and means for utilizing said control signal to energize said driving system to establish and maintain said receiver tuned to said selected signal channel.

4. A tunable television broadcast receiver comprising:
signal-translating means including at least one mechanically adjustable tuning element for tuning said receiver to any selected one of a plurality of television signal channels;
a rotatable member mechanically coupled to said tuning element to effect adjustment thereof;
a bi-directional driving system for rotating said member;
a selectively operable preset tuning device for energizing said driving system to rotate said member to a predetermined angular position corresponding to the tuning of said receiver to a selected one of said signal channels, said preset device including a cam rotatable with said member having two equiangular and space-opposed cam sections and a reference section interposed between contiguous portions of said space-opposed sections, a pair of energizing contacts for bi-directional control of said driving system, and a cam follower selectively engaging said energizing contacts during operating intervals in which said follower traverses said space-opposed cam sectors but disengaging said contacts when said follower traverses said reference section;
a frequency control system coupled to said signal-translating means for deriving a control signal having a polarity and amplitude representing the sense and magnitude of the deviation, if any, in the tuning condition of said receiver from that required to tune to said selected signal channel;

and means for utilizing said control signal to energize said driving system to establish and maintain said receiver tuned to said selected signal channel.

5. A tunable television broadcast receiver comprising:

signal-translating means including at least one mechanically adjustable tuning element for tuning said receiver to any selected one of a plurality of television signal channels;

a displaceable member mechanically coupled to said tuning element to effect adjustment thereof;

a bi-directional driving system for driving said member;

a frequency control system coupled to said signal-translating means for deriving a control signal having a polarity and amplitude representing the sense and magnitude of the deviation, if any, in the tuning condition of said receiver from that required to tune to a selected one of said signal channels;

means for utilizing said control signal to energize said driving system to establish and maintain said receiver tuned to said selected signal channel;

and means, in addition to said frequency control system, to restrict the deviation in tuning of said receiver to a predetermined maximum.

6. A tunable television broadcast receiver comprising:

signal-translating means including at least one mechanically adjustable tuning element for tuning said receiver to any selected one of a plurality of television signal channels;

a displaceable member mechanically coupled to said tuning element to effect adjustment thereof;

a bi-directional driving system for driivng said member;

a frequency control system coupled to said signal-translating means for deriving a control signal having a polarity and amplitude representing the sense and magnitude of the deviation, if any, in the tuning condition of said receiver from that required to tune to a selected one of said signal channels;

means for utilizing said control signal to energize said driving system to establish and maintain said receiver tuned to said selected signal channel;

and means, responsive to a deviation in tuning of said receiver in excess of a predetermined amount in either sense, for energizing said driving system to compensate for the deviation in tuning.

7. A tunable television broadcast receiver comprising:

signal-translating means including at least one mechanically adjustable tuning element for tuning said receiver to any selected one of a plurality of television signal channels;

a displaceable member mechanically coupled to said tuning element to effect adjustment thereof;

a bi-directional driving system for driving said member;

a frequency control system coupled to said signal-translating means for deriving a control signal having a polarity and amplitude representing the sense and magnitude of the deviation, if any, in the tuning condition of said receiver from that required to tune to a selected one of said signal channels;

means for utilizing said control signal to energize said driving system to establish and maintain said receiver tuned to said selected signal channel;

and means, responsive to a deviation in tuning of said receiver in excess of a predetermined amount in either sense, for superseding said frequency control system to energize said driving system and compensate for the deviation in tuning.

8. A tunable television broadcast receiver comprising:

signal-translating means including at least one mechanically adjustable tuning element for tuning said receiver to any selected one of a plurality of television signal channels;

a displaceable member mechanically coupled to said tuning element to effect adjustment thereof;

a bi-directional driving system for driving said member;

a frequency control system coupled to said signal-translating means for deriving a control signal having a polarity and amplitude representing the sense and magnitude of the deviation, if any, in the tuning condition of said receiver from that required to tune to a selected one of said signal channels;

means for utilizing said control signal to energize said driving system and displace said member to a predetermined position to establish and maintain said receiver tuned to said selected signal channel;

and means, responsive to the displacement of said member in excess of a given amount in either direction from said predetermined position, for energizing said driving system to displace said member toward said predetermined position.

9. A tunable television broadcast receiver for utilizing a program signal including a picture carrier and a sound carrier comprising:

signal-translating means including at least one mechanically adjustable tuning element for tuning said receiver to any selected one of a plurality of television signal channels;

a displaceable member mechanically coupled to said tuning element to effect adjustment thereof;

a bi-directional driving system for driving said member;

a frequency control system coupled to said signal-translating means for deriving a control signal having a polarity and amplitude representing the sense and magnitude of the deviation, if any, in the tuning condition of said receiver from that required to tune to said selected signal channel;

means for utilizing said control signal to energize said driving system to establish and maintain said receiver tuned to said selected signal channel;

and means, in addition to said frequency control system, to restrict the deviation in tuning of said receiver to a value that is less than the frequency separation of said carriers of said selected channel and the carriers of the program signals of adjacent channels.

10. A tunable intercarrier television broadcast receiver for utilizing a program signal including a picture carrier and a sound carrier having a predetermined frequency separation, said receiver comprising:

signal-translating means including an intermediate-frequency amplifier and at least one adjustable tuning element for tuning said receiver to any selected one of a plurality of television signal channels;

a frequency control system, having a bandwidth less than said frequency separation, coupled to said amplifier and responsive to the sound intermediate-frequency signal for deriving a control signal having a polarity and amplitude representing the sense and magnitude of the deviation, if any, in the tuning condition of said receiver from that required to tune to a selected one of said signal channels;

and means for utilizing said control signal to adjust said tuning element to establish and maintain said receiver tuned to said selected signal channel.

11. A tunable intercarrier television broadcast receiver for utilizing a program signal including a picture carrier and a sound carrier having a predetermined frequency separation, said receiver comprising:

signal-translating means including an intermediate-frequency amplifier and at least one adjustable tuning element for tuning said receiver to any selected one of a plurality of television signal channels, a trap circuit in said amplifier for attenuating the sound intermediate-frequency signal;

a frequency-control system coupled to said trap circuit and responsive to said sound signal for deriving a control signal having a polarity and amplitude representing the sense and magnitude of the deviation, if any, in the tuning condition of said receiver from that required to tune to a selected one of said signal channels;

and means for utilizing said control signal to adjust said tuning element to establish and maintain said receiver tuned to said selected signal channel.

12. A tunable television broadcast receiver for utilizing a program signal including a picture carrier and a sound carrier, said receiver comprising:

signal-translating means including at least one mechanically adjustable tuning element for tuning said receiver to any selected one of a plurality of television signal channels;

a rotatable member mechanically coupled to said tuning element to effect adjustment thereof;

a bi-directional driving system for rotating said member;

a selectively operable preset tuning device for energizing said driving system to rotate said member to a predetermined angular position corresponding to the tuning of said receiver to a selected one of said signal channels, said preset device including a cam rotatable with said member having two equiangular and space-opposed cam sections and a reference section interposed between contiguous portions of said space-opposed sections, a pair of energizing contacts for bi-directional control of said driving system, and a cam follower selectively engaging said energizing contacts during operating intervals in which said follower traverses said space-opposed cam sectors but disengaging said contacts when said follower traverses said reference section, the arc of said reference cam section representing a frequency change in the tuning of said receiver that is less than frequency separation of said picture and sound carriers of said selected channel relative to those of adjacent television channels;

a frequency control system coupled to said signal-translating means for deriving a control signal having a polarity and amplitude representing the sense and magnitude of the deviation, if any, in the tuning condition of said receiver from that required to tune to said selected signal channel;

and means for utilizing said control signal to energize said driving system to establish and maintain said receiver tuned to said selected signal channel.

13. A tunable television broadcast receiver for utilizing a program signal including a picture carrier and a sound carrier, said receiver comprising:

signal-translating means including at least one adjustable tuning element for tuning said receiver to any selected one of a plurality of television signal channels;

a frequency control system, having an acceptance bandwidth that is less than the carrier-frequency separation of adjacent television channels, coupled to said signal-translating means for deriving a control signal having a polarity and amplitude representing the sense and magnitude of the deviation, if any, in the tuning condition of said receiver from that required to tune to a selected one of said signal channels;

means for utilizing said control signal to adjust said tuning element to establish and maintain said receiver tuned to said selected signal channel;

and means, in addition to said frequency control system, to restrict the deviation in tuning of said receiver to a value that is also less than said frequency separation.

14. A tunable television broadcast receiver comprising:

signal-translating means including at least one adjustable tuning element for tuning said receiver to a selected one of a plurality of television signal channels;

a frequency discriminator-detector having input terminals connected to said signal-translating means and having output terminals which present a control potential having a polarity and amplitude which reflect the sense and magnitude of deviation, if any, from a reference of the frequency of the signal applied to said input terminals;

a pair of opposite gender transistor devices having input electrodes connected to said output terminals of said detector and having output electrodes;

means for adjusting said tuning element to control tuning of said receiver, said last-named means having an energizing circuit connected to said output electrodes of said transistors;

and means interposed between said detector and said input electrodes of said transistors to limit the excitation of said transistors to a predetermined maximum.

15. A tunable television broadcast receiver comprising:

signal-translating means including at least one adjustable tuning element for tuning said receiver to a selected one of a plurality of television signal channels;

a frequency discriminator-detector having input terminals connected to said signal-translating means and having output terminals which present a control potential having a polarity and amplitude which reflect the sense and magnitude of deviation, if any, from a reference of the frequency of the signal applied to said input terminals;

a pair of opposite gender transistor devices having input electrodes connected to said output terminals of said detector and having output electrodes;

means for adjusting said tuning element to control tuning of said receiver, and last-named means having an energizing circuit connected to said output electrodes of said transistors;

and a pair of semi-conductor diodes connected in opposed polarity across said output terminals to limit the excitation of said transistors to a value corresponding to the breakdown potential of said diodes.

16. A tunable television broadcast receiver comprising:

signal-translating means including at least one adjustable tuning element for tuning said receiver to a selected one of a plurality of television signal channels;

a frequency discriminator-detector having input terminals connected to said signal-translating means and having output terminals which present a control potential having a polarity and amplitude which reflect the sense and magnitude of deviation, if any, from a reference of the frequency of the signal applied to said input terminals;

a pair of opposite gender transistor devices having input electrodes connected to said output terminals of said detector and having output electrodes;

means for adjusting said tuning element to control tuning of said receiver, said last-named means having an energizing circuit connected to said output electrodes of said transistors;

a voltage source;

a normally open switch for connecting said voltage source to said energizing circuit;

and means, responsive to a deviation in tuning of said receiver in excess of a given amount, for closing said switch to excite said energizing circuit and compensate said deviation.

17. A tunable television broadcast receiver comprising:

signal-translating means including at least one adjustable tuning element for tuning said receiver to a selected one of a plurality of television signal channels;

a frequency discriminator-detector having input terminals connected to said signal-translating means and having output terminals which present a control potential having a polarity and amplitude which reflect the sense and magnitude of deviation, if any, from a reference of the frequency of the signal applied to said input terminals;

a pair of opposite gender transistor devices having input electrodes connected to said output terminals of said detector and having output electrodes;

means for adjusting said tuning element to control tuning of said receiver, said last-named means having an energizing circuit connected to said output electrodes of said transistors;

means for limiting the excitation of said transistors by said detector to a predetermined level;

a voltage source for exciting said transistors to a level exceeding said predetermined level;

a normally open switch for connecting said voltage source to said energizing circuit;

and means, responsive to a deviation in tuning of said receiver in excess of a given amount, for closing said switch to cause said voltage source to override said detector in the excitation of said energizing circuit.

No references cited.

WILLIAM C. COOPER, *Acting Primary Examiner.*

R. LINN, *Assistant Examiner.*